United States Patent Office 3,738,947
Patented June 12, 1973

3,738,947
PROCESS FOR MAKING FLAME RETARDED POLYURETHANE FOAM
John Fishbein, Marlowe, Raymond W. H. Bell, Great Kings Hill, and Anthony J. Clarke, Chinnor, England, assignors to Dunlop Holdings Limited, London, England
No Drawing. Filed Jan. 19, 1970, Ser. No. 4,041
Claims priority, application Great Britain, Jan. 31, 1969, 5,455/69
Int. Cl. C08g 22/44
U.S. Cl. 260—2.5 AM
4 Claims

ABSTRACT OF THE DISCLOSURE

Flame-resistant polyurethane foams are obtained by incorporating in the foam-forming reaction mixture a halogen-substituted aromatic amine having not more than one benzene ring, for example 4-chloro-m-phenylene diamine or p-chloro-aniline. The invention is particularly applicable to flexible foams of low density in respect of which it is possible to obtain foams which are self-extinguishing when exposed to flame.

---

This invention relates to polyurethane foams, especially flexible foams; and relates particularly to flame-resistant polyurethane foams and to methods of making them.

Conventional polyurethane foams, particularly those derived from polyethers, have little inherent resistance to burning (flame-resistance), and in view of the widespread use of polyurethane foams in mattresses, cushions and other upholstery there exists a demand for flame-resistant products. Previous proposals for reducing the inflammability of polyurethane foams have included the incorporation in the foam-forming reaction mixture of certain conventional flame retardants. However, these materials have either tended to be lost by evaporation during the foam-forming reaction or, if of sufficient molecular weight to preclude substantial loss by evaporation, they have because of their relatively high density, tended to concentrate in the lower regions of foam products during manufacture, especially where manufacture is by a continuous, free rise method producing a foam loaf. Consequently, in order to ensure that sufficient flame retardant is included in the upper regions of the loaf it has been necessary to incorporate in the foam-forming reaction mixture an amount of such conventional flame retardant substantially in excess of that which would be required if the retardant could be distributed evenly throughout the foam loaf.

We have now found, according to the present invention, that excellent flame-resistant polyurethanes can be obtained if there is incorporated in the foam-forming reaction mixture a halogen-substituted aromatic amine having not more than one benzene ring. In some cases the flame-resistant foams of this invention are in fact self-extinguishing under the test of British Standard Specification 2972. Accordingly, the present invention comprises a process for the production of a flame-resistant polyurethane foam by the interaction in a foam-forming reaction mixture of a polymeric polyol with an organic polyisocyanate, in the presence of a blowing agent, in which there is incorporated in the foam-forming reaction mixture a halogen-substituted aromatic amine having not more than one benzene ring.

The flame retardants of the invention can be mono- or poly-functional compounds. They should preferably, where they are poly-functional, not to be too reactive with the other foam-forming reactants, with a view to the adoption, as far as possible, of conventional reaction conditions. The amines can, for example, be ones in which all the amino groups are primary or all the amino groups are secondary, or some primary and some secondary.

The amine flame retardant can contain one, two or more halogen substituents, chlorine being of particular value. The amine can contain as optional substituents alkyl (e.g. methyl or ethyl), alkoxy (e.g. methoxy or ethoxy) and/or hydroxyl substituents. The substituents should preferably not interfere with the foam-forming reaction.

Where the amine flame retardant is a diamine it can, for example, be one having two primary amino groups. Suitable monocyclic aromatic primary diamines are, for example, a halogen-substituted p-phenylene diamine, o-phenylene diamine or m-phenylene diamine, for instance 4-chloro-m-phenylene diamine or 4-bromo-m-phenylene diamine.

Where the amine is a monoamine, it can be for example a halogen-substituted aniline (for instance p-chloro aniline or p-bromo aniline), toluidine, amino-phenol or alkoxy aniline.

The polyisocyanate can be a diisocyanate for instance tolylene diisocyanate (TDI). We have found that the flame-resistant properties of the foams of this invention are enhanced if, in the foam-forming reaction, there is used as polyisocyanate a crude TDI (that is a TDI which has not been purified by distillation) or a polymer of TDI, for instance an isocyanurate.

The flame retardants used in the method of this invention can be used for example in an amount of two to ten, especially two to five, parts per 100 parts of polyol (php.). The amount is conveniently more than 1% of the weight of the reaction mixture. The polyol can be, for example, a polyether or polyester polyol.

The invention is of particular use in the formation of low density foams such as foams having a density of not more than 0.045 g./cc. (for instance 0.025–0.040 g./cc.) for it is in such foams that the flame retardant effect is most pronounced. The flame retardant is believed to take part in the foam-forming reaction and is probably not present in its original form in the resultant foam material. The invention is applicable to "self-skin" mouldings.

Where the amine is of a very reactive nature it has been found that a more controllable result can be obtained if it is one in which the amino group (or at least one of the amino groups where there are more than one) is sterically hindered or otherwise reduced in activity by an adjacent group.

Another aspect of the present invention is that it is believed the polyurethane foams of the invention are flame-resistant by virtue of the compound incorporated as flame retardant in the foam-forming reaction (or a residue or product thereof) having entered into the molecular structure of the resultant polyurethane.

The invention is illustrated by the following examples which describe the production of a "one-shot" method of flexible, free-rise polyurethane foam obtained from polyether polyols. In the examples all parts are by weight unless otherwise stated. 80:20 TDI is a mixture of tolylene-2,4-diisocyanate and tolylene-2,6-diisocyanate in the proportions by weight 80:20. The undistilled TDI was that sold under the trademark Hylene THR which is an undistilled toluene diisocyanate having a free NCO content of about 43%. Propamine A and Dabco 33LV are respectively commercial N-dimethylethanolamine and triethylene diamine (that is, diazobicyclo octane) products. Propylan 555 is a polyoxyalkylene triol containing a high proportion of primary hydroxyl groups manufactured by Lankro Chemicals, Limited, England, having a hydroxyl value (mgm.) KOH/gm. of 35–37 and a viscosity at 25° C. (centipoises) of 835–870. Propylan 305 is a 3500 molecular weight triol polyether having an average OH value of 48, a pH of 6.5–7.5 and a viscosity at 25° C. (centipoises) of 535–570. The inflammability tests were carried out on at least two samples of foam in each instance.

EXAMPLE 1

A foam was prepared using the Formulation I as a control and a second form was obtained using a very similar formulation (II) but including 2 php. (parts per hundred of polyol) of 4-chloro-m-phenylene diamine (C.P.D.).

| | I (control) | II |
|---|---|---|
| 3,500 molecular weight (m.wt.) polyether polyol (Propylan 305) | 100 | 100 |
| Water | 3.2 | 3.2 |
| Propamine A | 0.3 | 0.3 |
| Stannous octoate | 0.3 | 0.15 |
| Silicone oil | 1.2 | 1.2 |
| C.P.D | | 2 |
| 80:20 TDI | 40.3 | 42.9 |

The density of the two foam products was 0.028 g./cc. Propylan 305 is a triol having an average OH value of about 48.

Both products were tested for inflammability by the British Railways Specification 541A. The control product was found to be inflammable whereas the product of the invention was not and indeed was self-extinguishing.

EXAMPLE 2

Example 1 was repeated by using Formulations III and IV respectively instead of I and II.

| | III (control) | IV |
|---|---|---|
| 5,000 mol. wt. poyol (Propylan 555) | 100 | 100 |
| Water | 3.0 | 3.0 |
| Triethylamine | 0.4 | 0.4 |
| Dabco 33LV | 0.4 | 0.4 |
| C.P.D | | 4 |
| Undistilled TDI | 40.4 | 45.6 |

Both of the resultant products had a density of 0.035 g./cc. Propylan 555 is now available from Lankro Chemicals Limited under the designation Propylan M12.

This material is a polyoxy alkylene triol containing a high proportion of primary hydroxyl groups and having a hydroxyl value of about 35 to 37.

EXAMPLE 3

Example 1 was repeated using Formulations IX and X instead of I and II respectively.

| | IX (control) | X |
|---|---|---|
| 5,000 mol. wt. (Propylan 555) | 100 | 100 |
| Water | 3.5 | 3.5 |
| Triethylamine | 0.4 | 0.4 |
| Dabco 33LV | 1.2 | 1.2 |
| C.P.D | | 4 |
| Isocyanate [1] | 58.6 | 65.8 |

[1] A mixture of 55% undistilled diphenylmethane diisocyanate (MDI) and 45% 80:20 TDI.

The density of the resultant foam products was 0.032 g./cc. When tested under BS 2972 the product from IX was inflammable while that from X was self-extinguishing.

EXAMPLE 4

A polyurethane foam was obtained from Formulation III of Example 2 except that there was incorporated in that formulation, instead of the 4-chloro-m-phenylene diamine, 4 php. of p-aminophenol. The foam product was self-extinguishing under BS 2972.

EXAMPLE 5

Example 1 was repeated but using Formulations XI and XII respectively instead of I and II.

| | XI (control) | XII |
|---|---|---|
| 5,000 mol. wt. polyol (Propylan 555) | 100 | 100 |
| Water | 3.0 | 3.0 |
| Triethylamine | 0.4 | 0.4 |
| Dabco 33LV | 0.4 | 0.4 |
| p-Chloraniline | | 4.0 |
| Undistilled TDI | 38.4 | 41.5 |

Both of the resultant products had a density of 0.032 g./cc.

Both products were tested for inflammability by the test of British Standard Specification BS 2972. The control product was inflammable whereas the product of the invention was self-extinguishing.

The polyurethane foams can be obtained by mixing the ingredients of the foam formulation as for conventional foams. For example, they can be mixed by way of three streams: (a) comprising the halogen-substituted amine dissolved in a minor portion (say one-tenth) of the polyol; (b) comprising a mixture of the water, catalysts, silicone (if any) of the remainder of the polyol; and (c) comprising the polyisocyanate.

It has been found that flexible polyurethane foams obtained according to the process of this invention especially where the halogen-substituted amine is a diamine, have enhanced load-bearing properties.

Where a silicone (siloxane) is used in the production of the polyurethane foam, care is sometimes necessary to ensure that it is not used in an excessive amount which can reduce the flame-resistance of the foam obtained. In general the amount of silicone is not more than 2 (preferably not more than 1.5) parts by weight per hundred of polyol.

We claim:

1. In a process for the production of an open-cell polyurethane foam having a density of not more than 0.045 g./cc. by the interaction in a foam-forming reaction mixture of a polymeric polyol with an organic polyisocyanate, in the presence of a blowing agent, the improvement which comprises incorporating in the foam-forming reactive mixture a flame-retardant consisting essentially of a halogen-substituted, aromatic diamine having not more than one benzene ring, the amine groups being primary or secondary, and said amine being present in an amount of 2–10 parts per 100 parts of polyol, whereby a flame-resistant foam is obtained.

2. A process according to claim 1, in which the amine is a halogen-substituted phenylene diamine.

3. A process according to claim 2, in which the amine is a chloro-substituted m-phenylene diamine.

4. A process according to claim 1, in which the polyisocyanate is crude tolylene diisocyanate.

References Cited

UNITED STATES PATENTS

| | | | |
|---|---|---|---|
| 2,778,810 | 1/1957 | Müller | 260—77.5 X |
| 3,036,996 | 5/1962 | Kogon | 260—77.5 AM |
| 3,489,723 | 1/1970 | Kraft | 260—77.5 |
| 2,621,168 | 12/1952 | Ross | 260—77.5 X |
| 3,563,906 | 2/1971 | Hoeschele | 260—2.5 X |
| 3,523,918 | 8/1970 | Gonzalez | 260—2.5 |
| 3,476,835 | 11/1969 | Schwachhofer | 260—2.5 X |
| 3,425,999 | 2/1969 | Axelrood | 260—2.5 X |
| 3,284,376 | 11/1966 | Pedjac | 260—2.5 |

MAURICE J. WELSH, Jr., Primary Examiner

C. W. IVY, Assistant Examiner

U.S. Cl. X.R.

260—2.5 AJ, 2.5 AT, 2.5 AZ